(12) United States Patent
Strutt et al.

(10) Patent No.: US 7,530,175 B2
(45) Date of Patent: May 12, 2009

(54) TWIN LEVEL

(75) Inventors: Benjamin John Strutt, Newcastle upon Tyne (GB); Oleksly P. Sergyeyenko, Brockville (CA); Gregory Scott Snider, Bel Air, MD (US)

(73) Assignee: Black & Decker Inc., Towson, MD (US)

( * ) Notice: Subject to any disclaimer, the term of this patent is extended or adjusted under 35 U.S.C. 154(b) by 0 days.

(21) Appl. No.: 11/935,137

(22) Filed: Nov. 5, 2007

(65) Prior Publication Data

US 2008/0141546 A1   Jun. 19, 2008

Related U.S. Application Data

(60) Provisional application No. 60/875,007, filed on Dec. 15, 2006.

(51) Int. Cl.
*G01C 9/00* (2006.01)
*G01C 9/18* (2006.01)

(52) U.S. Cl. .................................. 33/374; 33/381

(58) Field of Classification Search .................. 33/374, 33/376, 377, 379, 381, 383
See application file for complete search history.

(56) References Cited

U.S. PATENT DOCUMENTS

| | | | | |
|---|---|---|---|---|
| 747,850 | A * | 12/1903 | Bihlman | ...................... 33/376 |
| 970,729 | A | 9/1910 | Lingle | |
| 988,888 | A * | 4/1911 | Meier et al. | ................... 33/376 |
| 1,130,610 | A * | 3/1915 | Kane | .......................... 403/339 |
| 1,132,318 | A * | 3/1915 | Feder | .......................... 403/341 |
| 1,182,730 | A * | 5/1916 | Anderson et al. | ............. 33/376 |
| 1,655,766 | A | 1/1928 | Hildebrant | |
| 2,383,166 | A | 8/1945 | Seiwell | |
| 2,635,351 | A * | 4/1953 | Marcinkowski | .............. 33/376 |
| 3,180,035 | A * | 4/1965 | Olexson et al. | ............... 33/347 |
| 3,225,451 | A | 12/1965 | Olexson | |
| 4,099,118 | A | 7/1978 | Franklin et al. | |
| 4,464,622 | A | 8/1984 | Franklin | |
| 5,103,569 | A | 4/1992 | Leatherwood | |
| 5,412,875 | A * | 5/1995 | Hilderbrandt | ................ 33/374 |

(Continued)

FOREIGN PATENT DOCUMENTS

EP     1595654     11/2005

(Continued)

OTHER PUBLICATIONS

European Patent Office Search Report, Application Serial No. 07122937.1-1236, dated Mar. 26, 2008.

*Primary Examiner*—Christopher W Fulton
(74) *Attorney, Agent, or Firm*—Shook, Hardy & Bacon L.L.P.

(57) ABSTRACT

A twin level assembly including two levels, wherein one of the two levels also contains an indicating device for performing a separate function, is disclosed. The twin level assembly comprises a first level and a second level that is selectively receivable into the first level through an opening in an end cap and into a receptacle of the first level. The second level is held in the first level by a retention mechanism. The first level and the second level each have at least one bubble vial for visually displaying level indications, while the indicating device in the second level is a type of stud sensor, laser pointer, metal detector, wire detector, or a sonic measurement device.

15 Claims, 5 Drawing Sheets

U.S. PATENT DOCUMENTS

| | | |
|---|---|---|
| 5,433,011 A | 7/1995 | Scarborough et al. |
| 5,561,911 A * | 10/1996 | Martin ............... 33/365 |
| 6,047,478 A | 4/2000 | Sowers |
| 6,058,617 A | 5/2000 | Nadu |
| 6,282,805 B1 | 9/2001 | Cosentino |
| 6,293,023 B1 | 9/2001 | Schooley |
| 6,560,885 B1 | 5/2003 | Cosentino |
| 6,640,456 B2 | 11/2003 | Owoc et al. |
| 6,914,930 B2 * | 7/2005 | Raskin et al. ............ 372/109 |
| 7,281,335 B2 * | 10/2007 | Feliciano ............... 33/374 |
| 2002/0069543 A1 | 6/2002 | Owoc |
| 2003/0079357 A1 | 5/2003 | Liao |
| 2003/0093909 A1 | 5/2003 | Liao |
| 2003/0231303 A1 | 12/2003 | Raskin |

FOREIGN PATENT DOCUMENTS

| | | |
|---|---|---|
| GB | 2 210 167 | 6/1989 |
| WO | 2006079204 | 8/2006 |

* cited by examiner

TWIN LEVEL

CROSS-REFERENCE TO RELATED APPLICATIONS

This application claims the benefit of and priority to commonly owned U.S. Provisional Application Ser. No. 60/875,007, filed Dec. 15, 2006, which is hereby incorporated by reference in its entirety.

STATEMENT REGARDING FEDERALLY SPONSORED RESEARCH OR DEVELOPMENT

Not Applicable.

BACKGROUND OF THE INVENTION

A carpenter level, or spirit level as it is also known, is a commonly used tool by both craftsmen and homeowners for determining whether or not a surface is level, perpendicular to, or at a specified angle, relative to a datum or another surface. Levels are often used for a variety of other construction and decorative purposes, such as to determine whether walls are straight, shelves are level, and/or tiles are oriented at the desired angle. In operation, the level is placed against the surface in question by a user who can then view one or more bubble vials in the level to determine the position of the surface relative to a datum reference edge of the level. The user can then adjust the position of the surface in question as necessary, and again check the bubble vials in the level.

Levels come in a variety of sizes depending on the intended use. For example, often times smaller levels are used for checking the level of a decorative item such as a shelf, picture, or curtain rod. These levels may be only a few inches in length. On the other hand, longer levels which can sometimes extend a number of feet in length, are used for items having a greater surface area such as walls and floors. Depending on the task at hand, one or more levels, in varying sizes, may be required.

BRIEF SUMMARY OF THE INVENTION

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention are directed to a twin level assembly. In one aspect, the twin level assembly includes a first level having a second level selectively receivable through an opening in an end cap of the first level and into a receptacle of the first level. The second level is removably coupled with the first level by a retention mechanism. The first level and the second level each have at least one bubble vial and the second level preferably also has an indicating device for performing an additional function.

In another aspect, an embodiment of the present invention is directed towards a receptacle in a first level for receiving a second level. The receptacle includes a pair of generally parallel and longitudinally extending walls, a vertically extending sidewall positioned at one end of the generally longitudinally extending walls and perpendicular to the longitudinally extending walls, and an opening proximate an end of the pair of generally longitudinally extending walls, opposite the vertically extending sidewall. The receptacle also comprises a retention mechanism for removably coupling the second level with the first level.

In yet another aspect, an embodiment of the present invention is directed towards a twin level assembly having a first level and a second level, wherein the second level is selectively receivable through an opening in an end cap of the first level and into a receptacle of the first level. The first level and the second level each have at least one bubble vial and the second level also has a stud sensing device with an on/off actuator for detecting the presence of a stud behind a wall. The second level is removably coupled with the first level such that it can be used together with the first level or separate from the first level.

BRIEF DESCRIPTION OF THE SEVERAL VIEWS OF THE DRAWINGS

In the accompanying drawings, which form a part of the specification and are to be read in conjunction therewith and in which like reference numerals are employed to indicate like parts in the various views.

DETAILED DESCRIPTION

Figure 1:
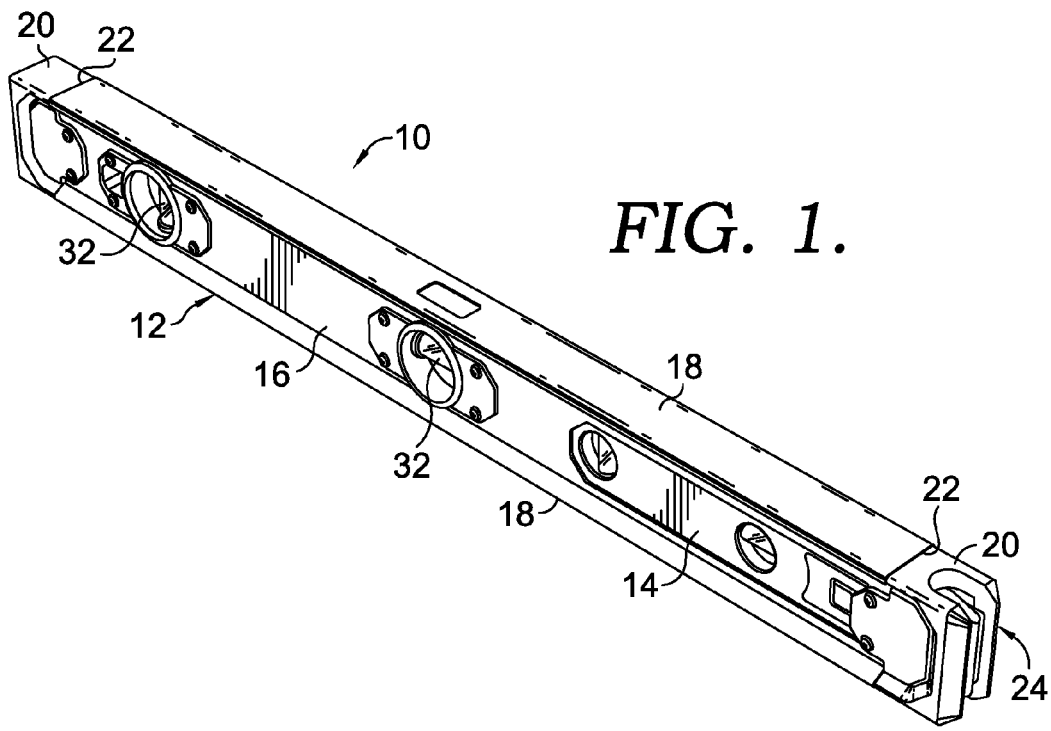
FIG. 1 is a perspective view of a twin level assembly in accordance with an embodiment of the present invention.
Figure 2:
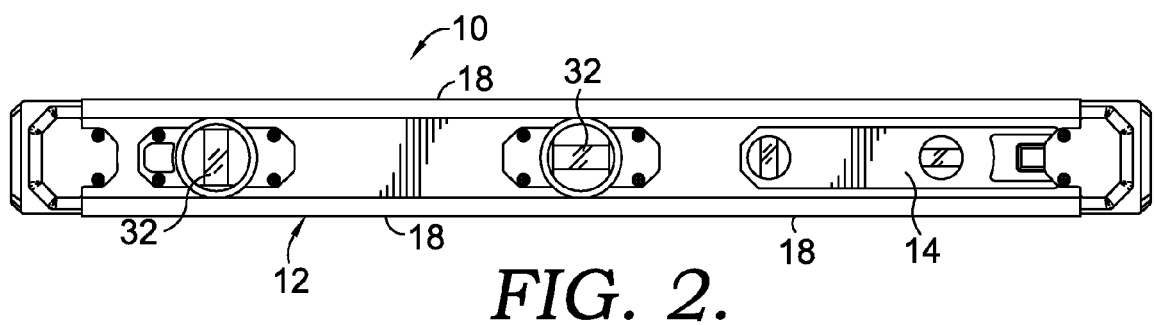
FIG. 2 is a side elevation view of the twin level assembly of FIG. 1.

With reference to the drawings, wherein like reference characters designate like parts throughout the different views, a twin level assembly according to an embodiment of the present invention is designated generally with the reference numeral 10. The twin level assembly 10 comprises a first level 12, also referred to as a spirit or carpenter level, and a second level 14, that contains a smaller torpedo sized level. The twin level assembly 10 is shown in perspective view in FIG. 1. The second level 14 is removably coupled within the first level 12. Further details of the first level 12 will be discussed first with respect to FIGS. 1-8.

Figure 5:
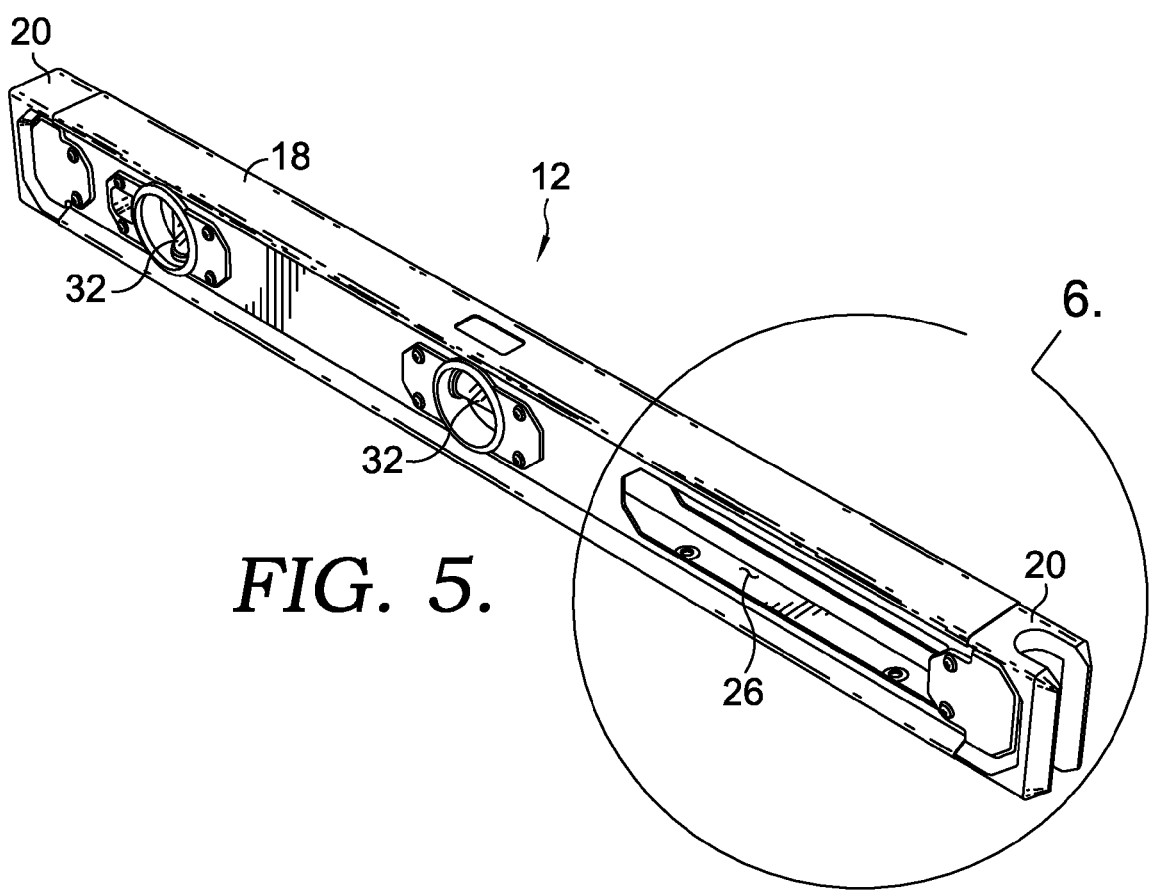
FIG. 5 is a perspective view of the first level of the twin level assembly.
Figure 6:
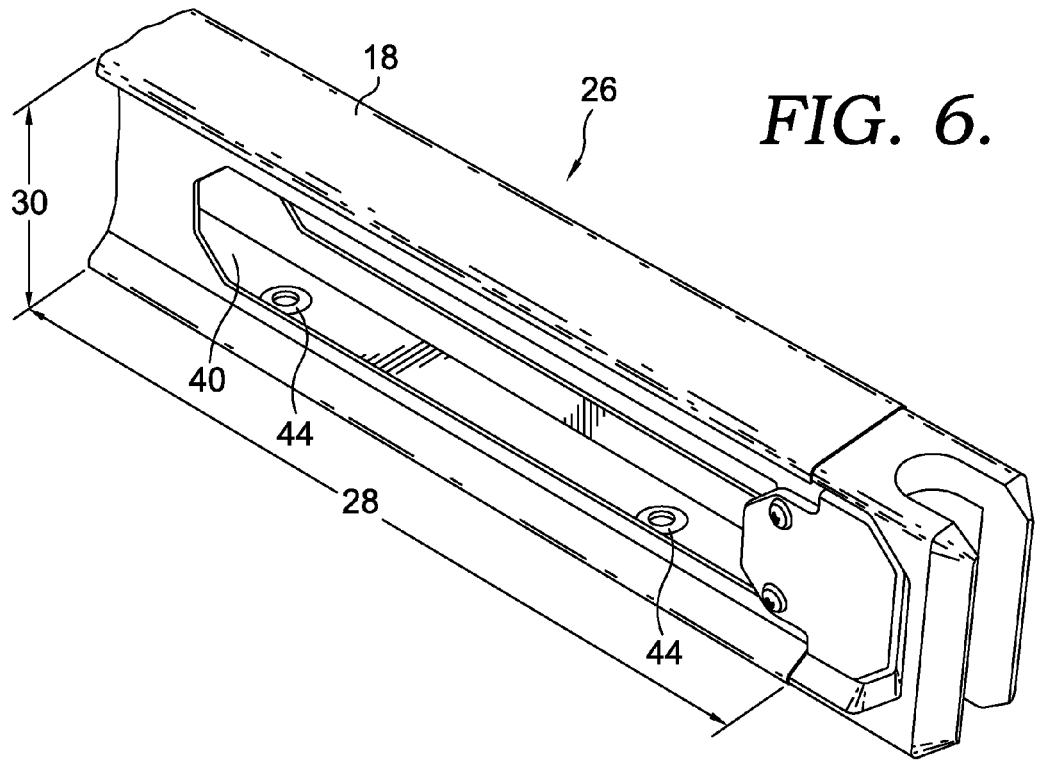
FIG. 6 is a fragmentary detailed perspective view of the open end of the first level of FIG. 5 taken in the area of numeral 6.

The first level 12 has a frame 16 with a pair of generally parallel and longitudinally extending edges 18 and at least one laterally extending end cap 20 coupled to the frame 16 proximate an end 22 of the longitudinally extending edges 18. Referring briefly to FIGS. 5 and 6, one end cap 20 has an opening 24 that is in communication with a receptacle 26 in the frame 16. This receptacle 26 extends a length dimension 28 along the longitudinally extending edges 18 and a height dimension 30 extending between the longitudinally extending edges 18. The receptacle 26 is located adjacent to one of the ends 22 of the first level 12, as shown in FIG. 5.

Referring back to FIGS. 1 and 2, the first level 12 also has at least one bubble vial 32 contained within the frame 16. The at least one bubble vial 32, which as one skilled in the art understands, is typically a closed and transparent, or partially transparent, vial containing a liquid substance. The vial 32 is not entirely filled such that a pocket of air or "bubble" is visible. The vial 32 is positioned in the frame 16 such that when an edge 18 of the first level 12 is positioned at a predetermined angle (i.e. horizontal, vertical, or at a forty-five degrees) with respect to a datum direction, the bubble is positioned in the middle of the vial 32 and provides a visual indication that the level 12 is in the desired orientation. For the embodiment shown in FIGS. 1-8, the vials 32 are oriented in vertical and horizontal directions so as to determine when an edge 18 of the first level 12 is oriented in a vertical or horizontal direction. Vials 32 can also be oriented within the frame 16 at a forty-five degree angle. In the first level 12, a vial 32 is positioned adjacent the end 22 opposite of the receptacle 26 and a vial 32 is also positioned proximate a midpoint along the frame 16 such that the vials 32 are alternately oriented to provide both horizontal and vertical level indications.

Figure 9:
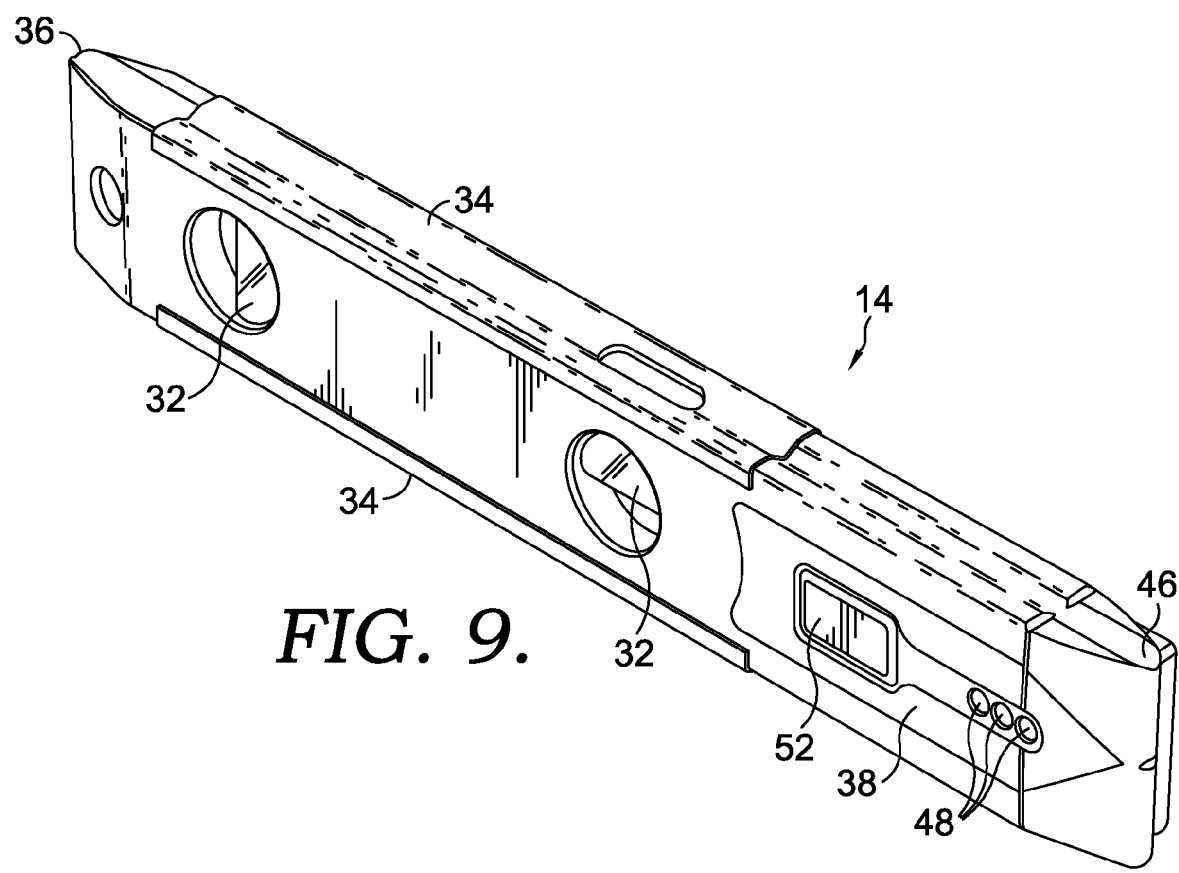
FIG. 9 is a perspective view of the second level of the twin level assembly.
Figure 10:
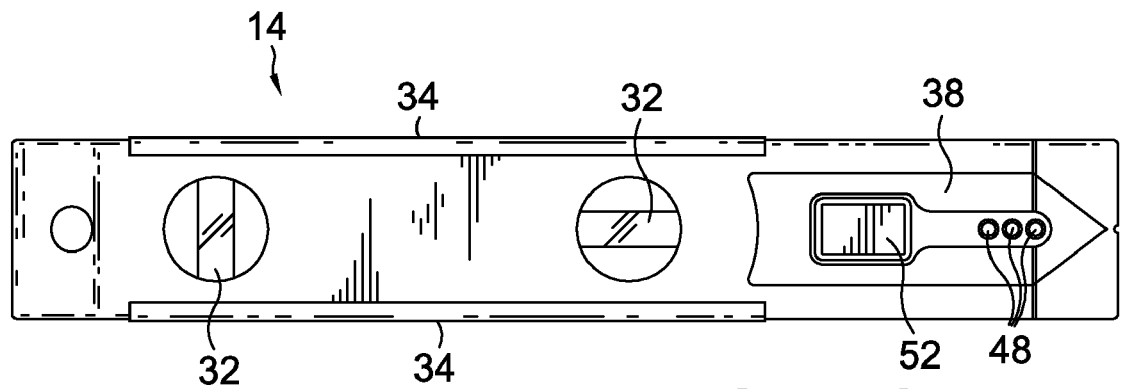
FIG. 10 is a front elevation view of the second level of FIG. 9.
Figure 11:
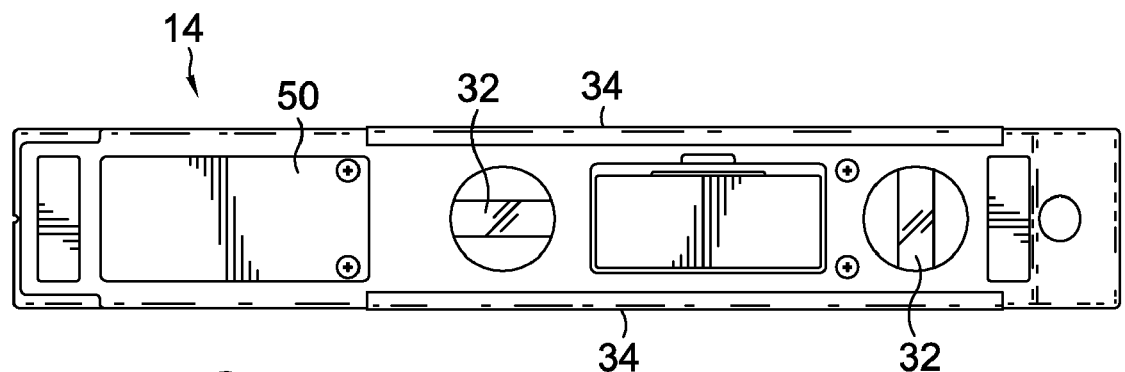
FIG. 11 is a rear elevation view of the second level of FIG. 9.

The twin level assembly 10 also comprises a second level 14, depicted in FIGS. 9-11, having a pair of generally parallel and longitudinally extending edges 34 connected by ends 36 and 46. As with the first level 12, the second level 14 has at least one bubble vial 32, with one vial positioned adjacent the end 36 and a second vial 32 positioned proximate a midpoint of the second level 14. The second level 14 also comprises an indicating device 38, that can be one of any number of devices that perform a function separate to that of the level. Examples of such indicating devices include, but are not limited to, a stud sensor, laser pointer, metal detector, wire detector, and a sonic measurement device. The front face of the indicating device 38 is shown in FIG. 10 and the rear face is shown in FIG. 11.

Figure 3:
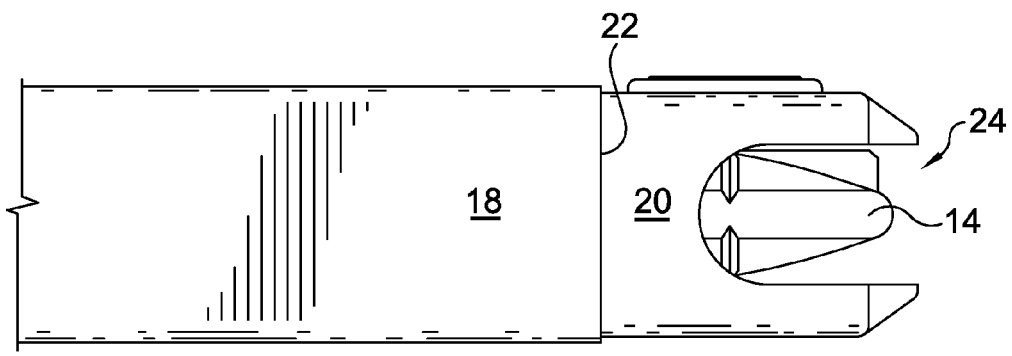
FIG. 3 is a partial top elevation view of the twin level assembly of FIG. 2 depicting an open end of the twin level assembly.
Figure 4:
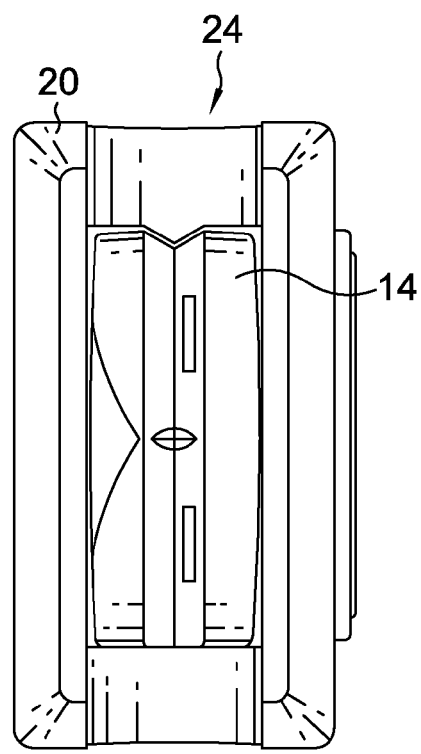
FIG. 4 is an end elevation view of the twin level assembly of FIG. 2 depicting the second level received within the opening of the first level.

As can be seen from FIGS. 1-4, the second level 14 has dimensions smaller than the respective dimensions of the first level 12, such that the second level 14 is sized to be selectively receivable in the receptacle 26 of the first level 12 through the opening 24 in the end cap 20 (see FIGS. 3 and 4). This arrangement provides capability for storing the second level 14 within the first level 12 when it is not being used and for combining the additional function of the second level 14 with the longer first level 12.

Figure 7:
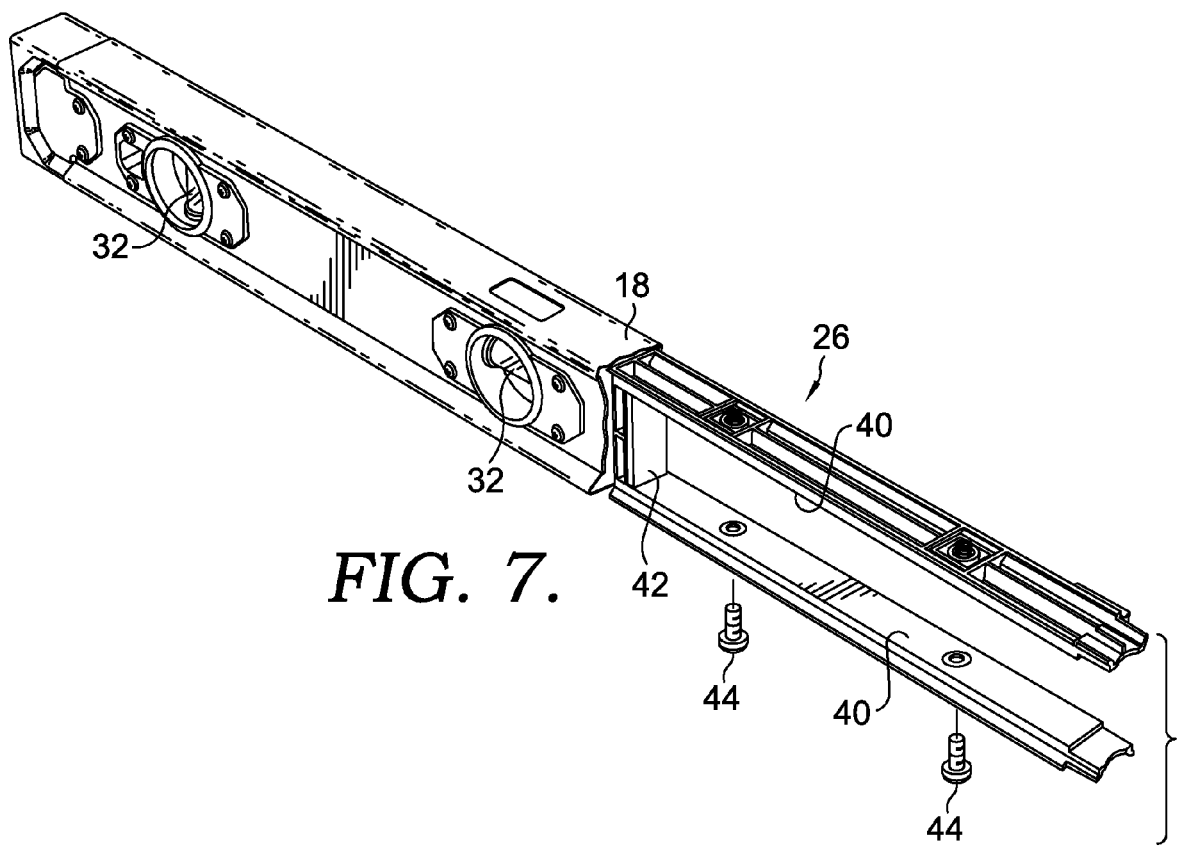
FIG. 7 is a detailed perspective view of the first level of FIG. 5 with a portion of the outer cover removed.
Figure 8:
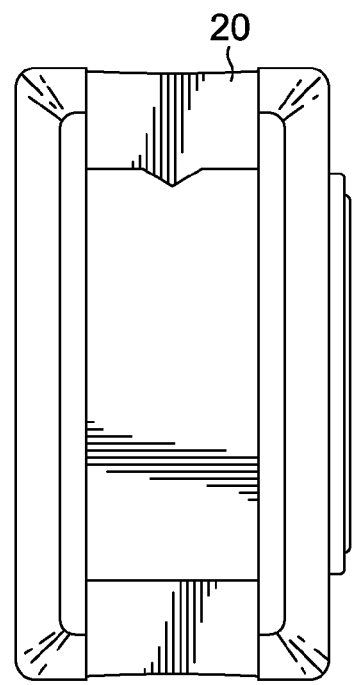
FIG. 8 is an end elevation view of the twin level assembly of FIG. 2, opposite of the end view depicted in FIG. 4.

The receptacle 26 provides a region where the second level 14 is stored within the first level 12. Referring to FIGS. 6 and 7, the receptacle 26 comprises a pair of generally parallel and longitudinally extending walls 40 each having a length dimension 28. A vertically extending sidewall 42 has a height dimension 30 that extends generally perpendicular to the longitudinally extending walls 40 so as to close one end of the receptacle 26. The height dimension 30 is less than that of the length dimension 28 such that the receptacle is generally rectangular. The opposite end of the receptacle 26, opposite to the vertically extending sidewall 42, has an opening 24 that is proximate the end of the pair of generally longitudinally extending walls 40.

The second level 14 can be placed into the receptacle 26 where at least a portion of the second level 14 is contained within the end cap 20 of the first level 12, as shown in FIG. 3. For durability purposes the second level 14 is designed to be completely contained within the receptacle 26 and end cap 20 of the first level 12. This ensures that the second level 14 is protected while the first level 12 is being used and the second level is stored or the two levels are being used together. The second level 14 is removably coupled to the receptacle 26 by way of a retention mechanism 44, which can be a spring clip projecting up into the receptacle 26, a magnet, a pin, a frictional fit between the second level 14 and the receptacle 26, or a threaded fastener. For the embodiment shown in FIGS. 6 and 7, the retention mechanism 44 is a threaded fastener that passes through the generally longitudinally extending members 40. The fasteners are tightened against the second level 14 to secure the second level against the first level 12. To remove the second level 14, the fasteners are loosened and the second level 14 can then be slid out of the receptacle 26 through the opening 24.

As previously discussed, the second level 14 further comprises an indicating device 38 that is selected from a group comprising a stud sensor, a laser pointer, a metal detector, a wire detector, and a sonic measurement device. This indicating device 38, as depicted in FIGS. 9-11, is positioned proximate the end 46 of the second level 14. The circuitry of the indicating device is not shown, but is typical of devices understood by those skilled in the art. Examples of such circuitry include, but are not limited to, U.S. Pat. Nos. 4,099,118 and 4,464,622, which are wholly incorporated herein by reference.

For the embodiment disclosed in FIGS. 9-11, the indicating device is a stud sensor. As one skilled in the art understands, a stud sensor is a device that is used to determine the location of framing studs, either wood or metal, behind drywall in light frame construction. This sensor can employ different technologies to detect the studs, such as a magnet to detect nails or screws used in wall assembly, an internal capacitor to detect changes in dielectric constant due to the presence of a stud, or a small radar system. The stud sensors typically locate either the edge of the stud or the center of the stud.

In order to alert the user of a located stud, the stud sensor depicted in FIGS. 9 and 10 further comprises a plurality of light emitting diodes (LED's) 48 that illuminate upon indication of a stud behind a wall. In addition to illuminating the LED's 48 or in lieu of illuminating the LED's 48, the stud sensor may also project an audible tone indicating the presence of a stud behind a wall. In the event the indicating device 38 is a device other than a stud sensor, the indicating device 38 will typically employ a form of visual and/or audio communication to a user, depending on its application. The second level 14 does not require a power supply in order to provide the leveling function. However, in order to operate as a stud sensor, a power supply is necessary, both to detect the stud and to illuminate the LED's 48 or project an audible tone or message. The power supply is preferably a DC power source, such as a battery that is stored in a compartment 50, accessible from the rear of the second level 14, as visible in FIG. 11. However, a variety of power sources capable of providing electric current to the indicating device can be utilized. The indicating device 38 is activated by a user depressing an on/off actuator 52, thereby closing a circuit and initiating a flow of electric current from the power supply to the indicating device.

The twin level assembly 10 can be fabricated from a variety of materials. However, to ensure durability, especially in the construction industry, the first level 12 and second level 14 are preferably fabricated from a hard thermoplastic such as acrylonitrile butadiene styrene (ABS) or polystyrene, an aluminum, a steel, or a combination thereof, depending on the desired durability and weight.

Incorporating an indicating device 38, such as a stud sensor, into the second level 14 allows the second level 14 to perform an additional function. Furthermore, when the second level 14 is located within the receptacle 26 of the first level 12, the first level 12 can then function as a stud sensor in addition to being a level. By sizing the first level 12 and second level 14 such that the second level 14 is removably coupled within the first level 12, this tool provides numerous advantages to a user from a functionality and storage perspective.

The present invention has been described in relation to particular embodiments, which are intended in all respects to be illustrative rather than restrictive. Alternative embodiments will become apparent to those skilled in the art to which the present invention pertains without departing from its scope.

From the foregoing, it will be seen that this invention is one well adapted to attain all the ends and objects set forth above, together with other advantages, which are obvious and inherent to the system and method. It will be understood that certain features and subcombinations are of utility and may be employed without reference to other features and subcombinations. This is contemplated and within the scope of the claims.

What is claimed is:

1. A twin level assembly comprising:
   a first level having a frame with a pair of generally parallel and longitudinally extending edges and at least one laterally extending end cap positioned proximate an end of the longitudinally extending edges, wherein the end cap has an opening therein, wherein the opening is in communication with a receptacle, wherein the receptacle extends a length dimension along the longitudinally extending edges and a height dimension between the longitudinally extending edges, and wherein the first level has at least one bubble vial in the frame; and
   a second level having a pair of generally parallel and longitudinally extending edges, at least one bubble vial and an indicating device, wherein the at least one bubble vial of the second level is intermediate the edges of the second level, and wherein the edges of the second level are spaced apart a distance less than the height dimension of the receptacle;
   wherein the entire second level is selectively fully receivable in the receptacle through the opening in the end cap of the first level, whereby when the first and second levels are not being used independent of each other, the receptacle provides a storage location for the second level.

2. The twin level assembly of claim 1, wherein the indicating device is selected from the group comprising: a stud sensor, a laser pointer, a metal detector, a wire detector, and a sonic measurement device.

3. The twin level assembly of claim 1, wherein at least a portion of the second level is contained within the end cap of the first level when the entire second level is fully received within the receptacle.

4. The twin level assembly of claim 1, wherein the second level is removably coupled to the first level by a retention mechanism.

5. The twin level assembly of claim 4, wherein the retention mechanism is a device selected from the group comprising a friction fit, a spring clip, a threaded fastener, a magnet, and a pin.

6. The twin level assembly of claim 4, wherein the retention mechanism consists of frictional contact between the second level and the receptacle of the first level.

7. The twin level assembly of claim 1, wherein the first level includes at least two bubble vials, wherein a first of the at least two vials is positioned adjacent an end of the first level opposite the receptacle, wherein a second of the at least two vials positioned proximate a midpoint along the frame of the first level, and wherein the first and second bubble vials are alternately oriented to provide both horizontal and vertical level indications.

8. The twin level assembly of claim 1, wherein the second level includes at least two bubble vials, wherein a first of the at least two vials is positioned adjacent an end of the second level, wherein a second of the at least two vials is positioned proximate a midpoint along the second level, and wherein the first and second bubble vials are alternately oriented to provide both horizontal and vertical level indications.

9. The twin level assembly of claim 1, wherein the first level and second level are fabricated from a hard thermoplastic, aluminum, steel, or a combination thereof.

10. A twin level assembly comprising:
    a first level having a frame with a pair of generally parallel and longitudinally extending edges and a pair of laterally extending end caps positioned proximate ends of the longitudinally extending edges, wherein one of the end caps has an opening therein, wherein the opening is in communication with a receptacle positioned in the first level, wherein the receptacle extends a length dimension along the longitudinally extending edges and has a height dimension between the longitudinally extending edges, and wherein the first level includes at least one bubble vial positioned in the frame; and
    a second level having a pair of generally parallel and longitudinally extending edges, the second level being sized for selective receipt of the entire second level in the receptacle through the opening in the end cap of the first level, and wherein the second level also includes at least one bubble vial and a stud-sensing device with an on/off actuator;
    wherein the second level and its stud-sensing device can be used both independently of the first level and in conjunction with the first level.

11. The twin level assembly of claim 10, wherein the stud-sensing device is positioned proximate an end of the second level.

12. The twin level assembly of claim 11, wherein the second level is coupled to a power supply.

13. The twin level assembly of claim 12, further comprising a plurality of light emitting diodes located on the stud-sensing device that indicate by illumination of the diodes a stud location behind a wall.

14. The twin level assembly of claim 10, further comprising a retention mechanism for removably coupling the second level within the receptacle of the first level.

15. The twin level assembly of claim 10, wherein the first and second levels each comprise two bubble vials alternately oriented to provide both horizontal and vertical level indications to both the first and second levels separately, as well as when the second level is coupled within the receptacle of the first level.

* * * * *